Dec. 23, 1924.
H. BRUCKER
POURING SPOUT AND CONTAINER
Filed June 27, 1923
1,520,006
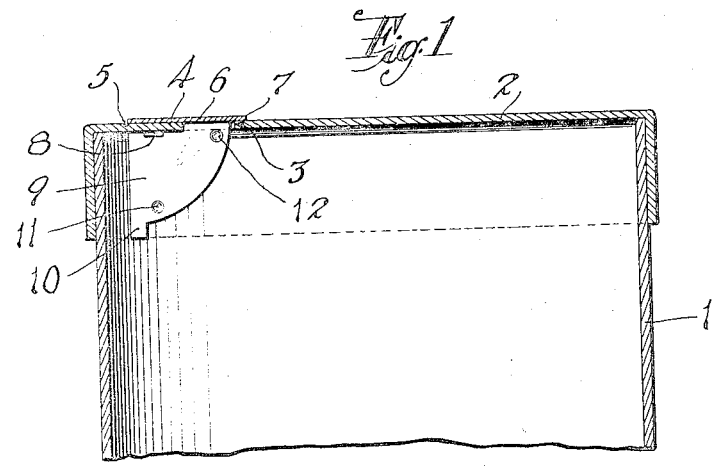
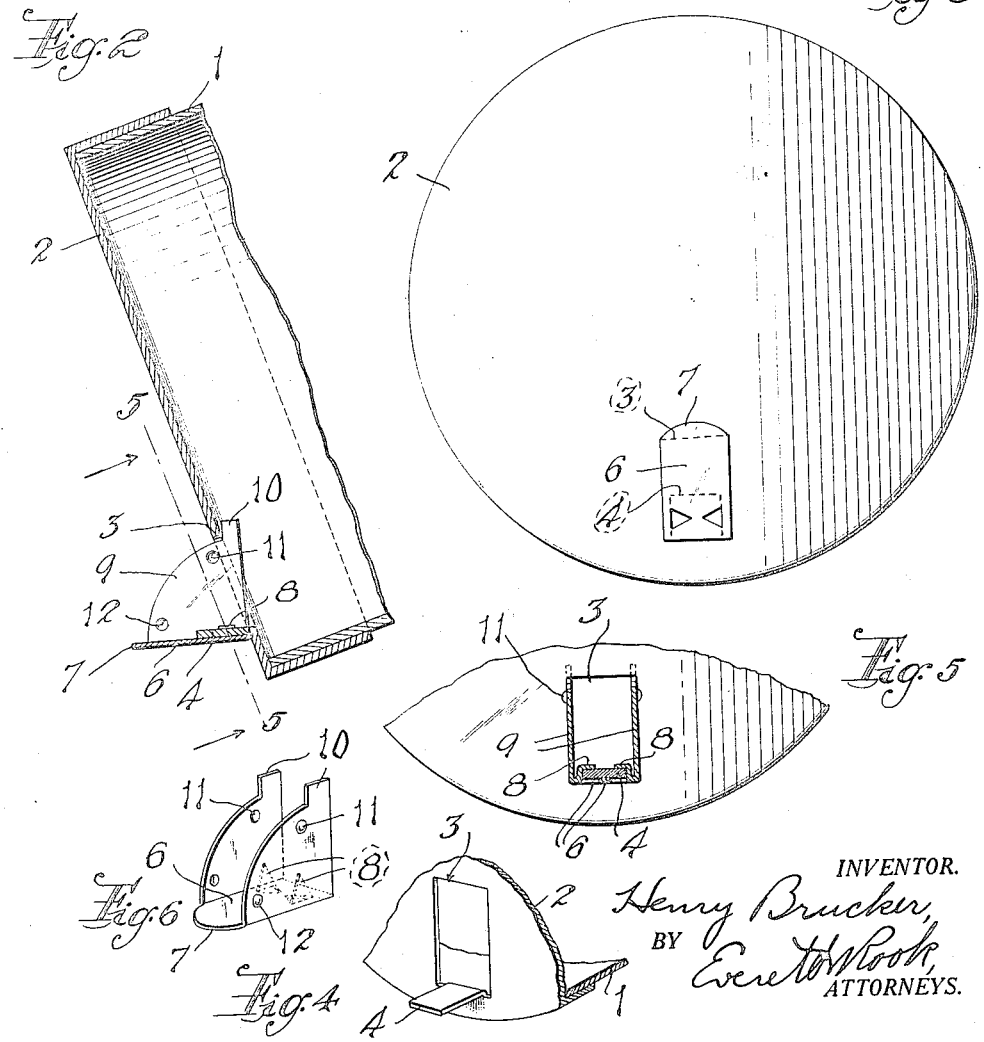
INVENTOR.
Henry Brucker,
BY Everett Rook,
ATTORNEYS.

Patented Dec. 23, 1924.

1,520,006

UNITED STATES PATENT OFFICE.

HENRY BRUCKER, OF NEWARK, NEW JERSEY, ASSIGNOR TO AMERICAN ALUMINUM WARE CO., A CORPORATION OF NEW JERSEY.

POURING SPOUT AND CONTAINER.

Application filed June 27, 1923. Serial No. 647,956.

*To all whom it may concern:*

Be it known that I, HENRY BRUCKER, a citizen of the United States, and a resident of Newark, in the county of Essex and State of New Jersey, have invented new and useful Improvements in Pouring Spouts and Containers, of which the following is a specification.

This invention relates in general to a pouring spout for containers of a type including a bottom or body portion hingedly connected to one wall of a discharge opening in the container and formed with resilient arcuate side wings concentric with the axis of hinging to frictionally engage the walls of said opening, so that the body portion normally serves as a closure for the opening and is adapted to be swung outwardly therefrom to serve as a pouring spout when it is desired to discharge the contents of the container through said opening.

One object of the invention is to provide a novel and improved combination of a pouring spout and a container whereby a hinge connection of maximum strength is obtained and at the same time the connection of the spout to the container and the construction of the spout is simple and inexpensive.

Another object is to provide novel, improved and simple means for retaining the spout in both closed and open position.

Further objects are to provide a novel and improved combination of pouring spout and container comprising a tongue projecting integrally from one wall of the opening of the container and a pouring spout having a plurality of spaced ears stamped therefrom to receive said tongue of the container between them, said spout being adapted to be applied to said container by merely slipping the wings thereof through said opening and pressing said ears downwardly over said tongue; to provide the side wings of said spout with outward projections adjacent their inner and outer ends to engage the inner and outer sides of the wall of the container to retain the spout in open and closed positions respectively, and to obtain other results and advantages as may be brought out by the following description.

Referring to the accompanying drawings, in which the same reference characters designate corresponding and like parts, Figure 1 is a fragmentary vertical sectional view through one end of a container and pouring spout embodying my invention, showing the spout in closed position;

Figure 2 is a similar view showing the spout in open position;

Figure 3 is a top plan view of the top or cover of the container with the spout in closed position;

Figure 4 is a fragmentary perspective view of the top of the container with the spout removed;

Figure 5 is a transverse sectional view taken on the line 5—5 of Fig. 2, and

Figure 6 is a perspective view of the spout detached from the container.

In the specific embodiment of the invention shown on the drawings, the reference character 1 designates a container of any suitable and known construction having a top or cover 2. A discharge opening 3 is formed in the top or cover 2, said opening being substantially rectangular in shape and being provided at one end thereof with an inwardly projecting tongue 4 integral with the top or cover 2. At the base of the tongue 4 the outer side of the top 2 of the container is preferably scored, as at 5.

The pouring spout is preferably formed of sheet metal and includes a body portion or bottom 6 of substantially the same shape as the discharge opening 3 except that one end of the body portion is adapted to overlie the tongue 4 and the other end is provided with a nose or extension 7. The body portion 6 is formed with a pair of oppositely disposed ears 8 which may be stamped therefrom, as clearly shown in Figures 5 and 6, said ears being adapted to receive the tongue 4 between them to hingedly connect the spout to the container. The body portion is preferably slightly wider than the opening 3 and the sides thereof are provided with integral resilient wings 9 which are preferably arcuate and concentric with the point of hinging of the spout 6 and at substantially right angles to said body portion.

In applying the spout to the container, the wings 9 are slightly pressed toward each other and slipped through the opening 3 of the container until the body portion 6 closes the opening and overlies the tongue 4 at one end with the nose 7 overlying the top of the container at the other end. The ears 8 are then pressed into tight engagement with the tongue 4, as shown in Figures 2 and 4, whereby the spout is securely fastened to the tongue. The spout is thus adapted to normally close the opening 3 and has a tight engagement with the walls thereof. When it is desired to discharge the contents of the container, the finger nail of the user is slipped beneath the nose 7 and the spout swung outwardly into the position shown in Figure 2, the material of the top of the container at the base of the tongue 4 serving as the point of hinging. To limit the outward movement of the spout, the inner ends of the wings 9 may be provided with extensions 10 to engage the inner side of the top 2 of the container. It will be obvious that the wings 9 will be maintained in snug frictional engagement with the side walls of the openings 3 so as to prevent the escape of material from the container between the said wings and the openings.

For the purpose of positively maintaining the spout in both open and closed positions, I may form the wings 9 adjacent their inner and outer ends with projections 11 and 12 preferably pressed from the metal and adapted to engage the outer and inner sides of the top 2 of the container to retain the spout in open and closed positions, respectively. The resiliency of the wings 9 will permit said projections to slip by the walls of the openings 3 as the spout is moved from closed to open position and vice versa.

With this construction it will be seen that the spout is positively held from accidental displacement from the openings 3 by the extensions 10 and the tongue 4 secured to the spout by the ears 8. The only operation necessary for securing the spout to the container is the pressing of the ears 8 against the tongue 4. It will also be noted that the inner end of the body portion 6 of the spout reenforces the tongue 4 and prevents buckling of the material of the top 2 at the point of hinging 5. The wings 9 and body portion 1 being disposed between the sides of the tongue 4 and the walls of the opening 3, and the body portion overlying the tongue exteriorly of the top 2 of the container, ensure a tight closure of the opening 3 by the spout.

I am aware of such constructions as shown in Patent No. 1,089,774 to Kuechenmister, et al, March 10, 1914, and No. 1,130,825 to Jones, May 9, 1915, and do not desire to be understood as attempting to claim such constructions. It will be obvious that many modifications and changes can be made in the details of construction of the spout and container without departing from the spirit or scope of the invention, and therefore I do not desire to be understood as limiting myself except as required by the following claims when construed in the light of the prior art.

Having thus described the invention, what I claim is:

1. The combination of a container having a discharge opening in one wall thereof provided with an integral tongue at one side thereof, and a spout adapted to normally close said opening and formed with opposite spaced ears to clamp said tongue between themselves and said body portion to hingedly connect said spout to said container exteriorly of said wall thereof, said spout being adapted to be connected to said tongue by slipping said tongue between said ears and bending the ears downwardly onto the tongue.

2. The combination of a container having a discharge opening in one wall thereof provided with an integral tongue at one side thereof, and a spout including a body portion of a size to overlie said opening and said tongue exteriorly of said wall of the container, said body portion having opposite side wings adapted to slide into and out of said opening and frictionally engage the walls thereof and being provided with spaced inwardly projecting ears between said wings to clamp said tongue between themselves and said body portion to hingedly connect said sprout to said container.

3. The combination of a container having a discharge opening on one wall thereof and a sheet metal spout hingedly connected at one end to said wall, said spout including a body portion to normally close said opening and arcuate side wings concentric with the point of hinging to swing into and out of said opening, one of said wings having an integral projection pressed therefrom adjacent its inner end to engage the outer side of said wall and retain the spout in open position.

4. The combination of a container having a discharge opening in one wall thereof and a sheet metal spout hingedly connected at one end of said wall, said spout including a body portion to normally close said opening and arcuate side wings concentric with the point of hinging to swing into and out of said opening, one of said wings having projections thereon one adjacent each end thereof to engage the outer and inner sides of said wall opening to retain the spout in open and closed positions respectively.

5. A sheet metal pouring spout for containers including a body portion having arcuate side wings concentric with one end thereof and spaced integral ears stamped from said portion inwardly between said ears, one of said wings having integral projections pressed outwardly therefrom one adjacent each end thereof.

HENRY BRUCKER.